(12) United States Patent
Kobayashi et al.

(10) Patent No.: US 6,481,483 B1
(45) Date of Patent: Nov. 19, 2002

(54) APPARATUS AND PROCESS FOR MAKING ELASTIC COMPOSITE SHEET

(75) Inventors: Toshio Kobayashi, Kagawa-ken (JP); Hideyuki Ishikawa, Kagawa-ken (JP); Satoshi Mitsuno, Kagawa-ken (JP)

(73) Assignee: Uni-Charm Corporation, Ehime-ken (JP)

( * ) Notice: Subject to any disclaimer, the term of this patent is extended or adjusted under 35 U.S.C. 154(b) by 71 days.

(21) Appl. No.: 09/610,589

(22) Filed: Jul. 5, 2000

(30) Foreign Application Priority Data

Jul. 6, 1999 (JP) ............................. 11-192295

(51) Int. Cl.⁷ .............................................. B32B 3/00
(52) U.S. Cl. ........................................ 156/462; 156/461
(58) Field of Search ................................. 156/201, 210, 156/462, 474, 209, 461; 264/290.2; 425/369

(56) References Cited

U.S. PATENT DOCUMENTS

| 2,494,431 A | * | 1/1950 | Eckstein ..................... 223/32 |
| 3,545,054 A | * | 12/1970 | Sando et al. .................... 26/51 |
| 4,102,720 A | * | 7/1978 | Kaneko et al. ............. 156/209 |
| 4,718,958 A | * | 1/1988 | Kugelmann, Sr. ........... 156/163 |
| 4,834,741 A | * | 5/1989 | Sabee ......................... 156/164 |
| 5,167,897 A |   | 12/1992 | Weber et al. ............. 264/288.8 |

FOREIGN PATENT DOCUMENTS

| DE | 196 04 953 | 8/1997 |
| JP | 10-245757 | 9/1998 |
| WO | WO 97 02133 | 1/1997 |

\* cited by examiner

*Primary Examiner*—Michael W. Ball
*Assistant Examiner*—Barbara Musser
(74) *Attorney, Agent, or Firm*—Lowe Hauptman Gilman & Berner, LLP

(57) ABSTRACT

An apparatus for making an elastic composite sheet including a pair of rolls adapted to bond respective surfaces of a non-stretchable sheet and a stretchable sheet and fed together into a nip of the rolls. one of the rolls is formed with ridges while the other roll is formed with grooves and the ridges are engaged with the grooves with spaces left between surfaces of the ridges and the grooves to form the non-stretchable sheet on its surface with stripe-like crests and flat troughs each defined between each pair of adjacent crests; and the non-stretchable sheet is bonded along its troughs to the surface of the stretchable sheet.

13 Claims, 3 Drawing Sheets

APPARATUS AND PROCESS FOR MAKING ELASTIC COMPOSITE SHEET

BACKGROUND OF THE INVENTION

This invention relates to an apparatus for making an elastic composite sheet.

Japanese Patent Application Disclosure No. 1998–245757 describes a process for making a sheet-like elastic composite comprising the steps of feeding a thermoplastic non-stretchable sheet into a nip between a heat-embossing roll formed on its peripheral surface with stripe-like ridges and grooves and a roll formed on it's peripheral surface with the similar ridges and grooves adapted to be engaged with those of the heat-embossing roll to form the non-stretchable sheet with the corresponding ridges and grooves, and feeding a stretchable sheet together with the non-stretchable sheet formed with the ridges and grooves into a nip between the embossing roll and a flat roll to heat-seal the non-stretchable sheet only along the ridges formed thereon with the stretchable sheet.

The process described in the Japanese Patent Application Disclosure No. 1998–245757 requires two separate the steps, i.e., the step of forming the non-stretchable sheet with the ridges and grooves and the step of heat-sealing the non-stretchable sheet to the stretchable sheet. On the step of forming the non-stretchable sheet with the ridges and grooves, heat transfer inevitably occurs from the embossing roll and the roll having the ridges and the grooves adapted to be engaged with those of the embossing roll to substantially the whole surface of the non-stretchable sheet. Such heat transfer hardens the non-stretchable sheet and thereby deteriorates a touch expected for this non-stretchable sheet.

SUMMARY OF THE INVENTION

It is an object of this invention to provide an apparatus for making an elastic composite sheet enabling the elastic composite sheet to be made through a fewer number of steps than the prior art has required without a deterioration of a touch expected to be presented by the sheet.

According to one aspect of this invention, there is provided an apparatus for making an elastic composite sheet from a supply of stretchable and non-stretchable sheets, the apparatus comprising a pair of rolls opposed to each other adapted to bond respective surfaces of the non-stretchable sheets and a stretchable sheets placed one upon another and fed together into a nip of the pair of rolls to each other, wherein:

one of the rolls is formed on a peripheral surface thereof with a plurality of ridges projecting outward radially of the roll and extending circumferentially at predetermined intervals while the other of the rolls is formed on a peripheral surface thereof with a plurality of grooves recessed inward radially of the roll and extending also circumferentially at predetermined intervals; the ridges are engaged with the grooves with spaces left between surfaces of the ridges and the grooves to form the non-stretchable sheets on a surface of one of the rolls so as to conform thereto with a plurality of stripe-like crests extending in one direction and a plurality of flat troughs each defined between each pair of adjacent crests and the non-stretchable sheets are spaced apart from the plurality of grooves of the other of the rolls; and a bonder bonds the non-stretchable sheets only along the troughs thereof to the surface of the stretchable sheet.

The apparatus for making the elastic composite sheet' as has been described hereinabove is advantageous in that the non-stretchable sheet can be formed on its surface with a plurality of stripe-like crests extending in one direction and a plurality of troughs each defined between each pair of adjacent crests extending also in the one direction and simultaneously the troughs of the non-stretchable sheet can be bonded to the surface of the stretchable sheet merely by feeding the non-stretchable sheet together with the stretchable sheet into the nip between a pair of rolls. In this way, the elastic composite sheet can be made through the minimum number of steps. The ridges and the grooves formed on the respective rolls are engaged with one another in a non-contact fashion such that the crests of the non-stretchable sheet is spaced apart from the plurality of troughs of the other of the rolls and therefore it is not apprehended that heat might be transferred to the crests of the non-stretchable sheet and deteriorate a touch presented by these crests of the nonstretchable sheet.

DETAILED DESCRIPTION OF THE PREFERRED EMBODIMENTS

Details of an apparatus according to this invention for making an elastic composite sheet will be more fully understood from the description given hereunder with reference to the accompanying drawings.

Figure 1:
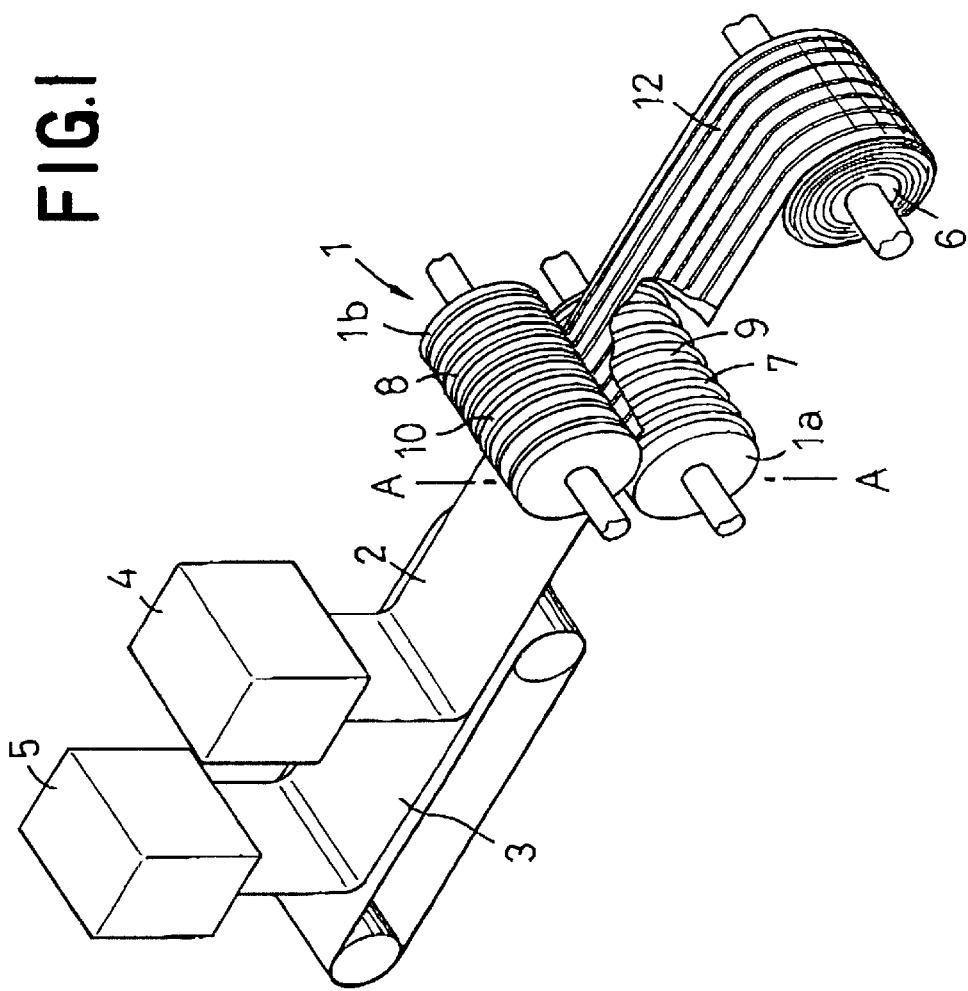
FIG. 1 is a perspective view of an apparatus according to this invention for making an elastic composite sheet.
Figure 2:
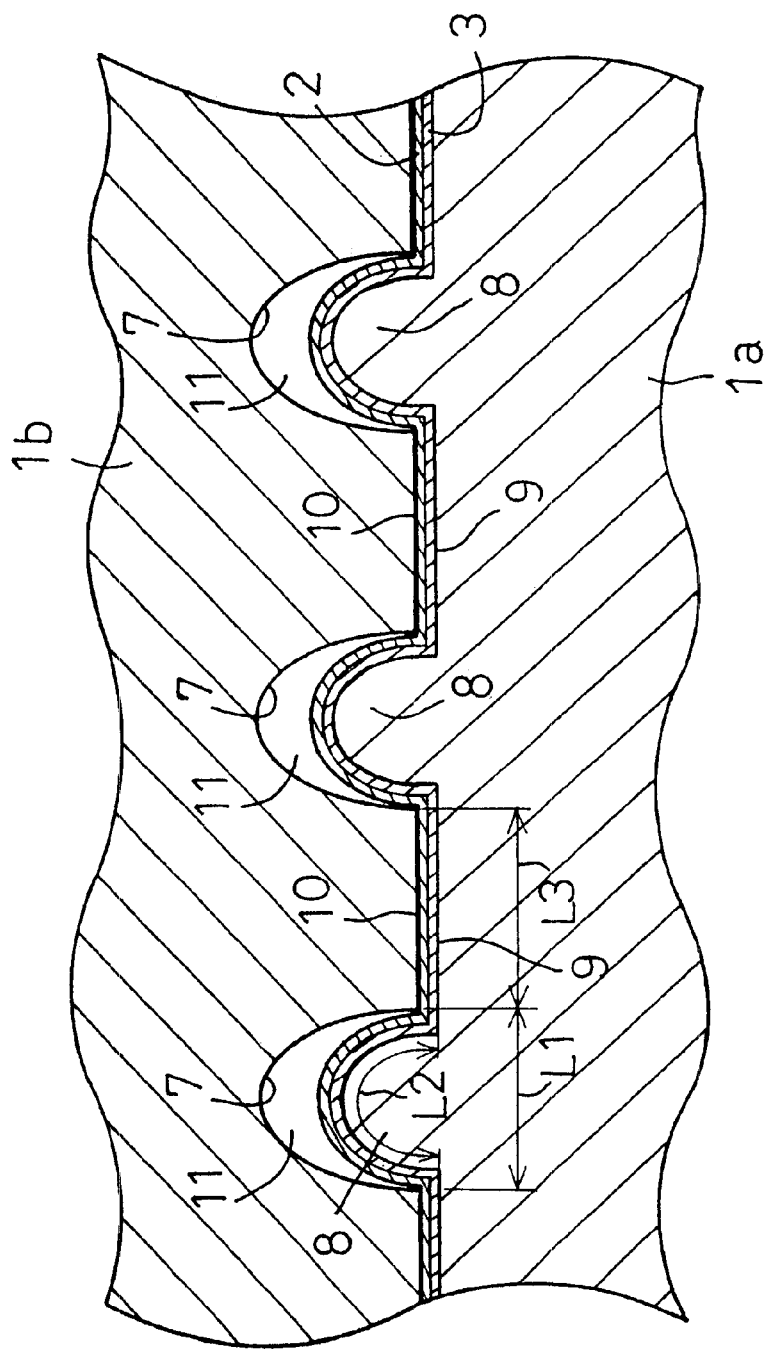
FIG. 2 is a sectional view taken along line A—A in FIG. 1.

FIG. 1 is a perspective view of an apparatus 1 for making an elastic composite sheet and FIG. 2 is a sectional view taken along line A—A to show an important part of the apparatus. Referring to FIG. 1, upstream of the apparatus 1, there are provided feeders 4, 5 of a non-stretchable sheet 2 and a stretchable sheet 3, respectively. Downstream of the apparatus 1, there is provided a take-up roller 6 for a finished composite sheet 12. The apparatus 1 comprises a pair of rolls 1a, 1b vertically opposed to each other.

The lower roll 1a is formed on its peripheral surface with a plurality of ridges 7 projecting outward radially of the roll 1a. The upper roll 1b is formed on its peripheral surface with a plurality of grooves 8 recessed inward radially of the roll 1b and adapted to be engaged with the ridges 7 on the lower roll 1a. The ridges 7 and the grooves 8 extend circumferentially around an axis of the rolls 1a, 1b. With the apparatus 1 of this invention, spaces 11 are left between surfaces of the ridges 7 and grooves 8 when the ridges 7 on the roll 1a are engaged with the grooves 8 on the roller 1b, as will be apparent from FIG. 2. At least one of these rolls 1a, 1b is heated to seal the two sheets 2, 3 to each other. It is also possible to arrange the ridges 7 and the grooves 8 to extend axially of these rolls 1a, 1b.

The non-stretchable sheet 2 and the stretchable sheet 3 are fed from the respective feeders 4, 5 so that the nonstretchable sheet 2 may overlie the stretchable sheet 3. These sheets 2, 3 are laminated with each other in the course defined between the feeders 4, 5 and the apparatus 1 and then enter a nip between the pair of rolls 1a, 1b. In this contact zone defined between the ridges 7 and the grooves 8 on the rolls 1a, 1b, respectively, the non-stretchable sheet 2 lies adjacent the grooves 8 and the stretchable sheet 3 lies adjacent the ridges 7. These sheets 2, 3 are stretched by the ridges 7. The ridges 7 and the groove 8 are not in surface-contact relationship and therefore the non-stretchable sheet 2 is not heat-sealed with the stretchable sheet 3. The non-stretchable sheet 2 and the stretchable sheet 3 are heat-sealed with each other on flat surfaces 9, 10 of the respective rolls 1a, 1b defined between each pair of adjacent ridges 7 and defined between each pair of adjacent grooves 8, respectively.

Having left the apparatus 1, regions of the stretchable sheet 3 having been stretched by engagement between the ridges 7 and the grooves 8 substantially restore their initial flatness under an elasticity of the sheet 3 while the non-stretchable sheet 2 is formed thereon with a plurality of stripe-like crests 2a extending in one direction. The non-stretchable sheet 2 is formed by the flat surfaces 9, 10 of the respective rolls 1a, 1b between each pair of the adjacent crests 2a with a practically flat trough 2b. These flat troughs 2b of the non-stretchable sheet 2 are heat-sealed with the stretchable sheet 3.

In the apparatus 1, a value corresponding to an arc dimension L2 of the ridge 7 divided by a chord of the ridge connecting opposite ends of the arc L1 should be in a range of 1.5–4.5. At the value less than 1.5, the arc dimension of the crest 2a formed on the surface of the non-stretchable sheet 2 would be insufficient to obtain a desired stretch ratio of the composite sheet 12. At the value higher than 4.5, depending on the maximum stretch ratio of the stretchable sheet 3, the crest 2a of the non-stretchable sheet 2 would slacken even after the maximum stretch ratio has been exceeded. Consequently, a touch presented 'by the non-stretchable sheet 2 would be deteriorated.

In the apparatus 1, a value corresponding to the chord dimension L1 of the ridge 7 divided by a dimension L3 between a pair of the adjacent ridges 7, more specifically, between one end of one ridge 7 and one end of an adjacent ridge 7 opposed to each other should be in a range of 0.1–0.5. At the value less than 0.1, the dimension of the respective flat surfaces 9, 10 formed on the rolls 1a, 1b, respectively, would be insufficient to achieve a reliable sealing between the nonstretchable sheet 2 and the stretchable sheet 3. At the value higher than 0.5, the number of relatively rigid seal lines would increase on the non-stretchable sheet 2 as well as on the stretchable sheet 3, resulting in a deteriorated touch of the composite sheet 12.

A stretch ratio of the composite sheet 12 made by the apparatus 1 can be calculated according to the following equation:

$$\text{Stretch ratio} = \{(L2+L3/L1+L3)-1\} \times 100$$

where

L1=chord dimension of ridge 7

L2=arc dimension of ridge 7

L3=dimension between adjacent ridges 7, 7.

The stretch ratio of the composite sheet 12 should be in a range of 33–318%.

Figure 3:
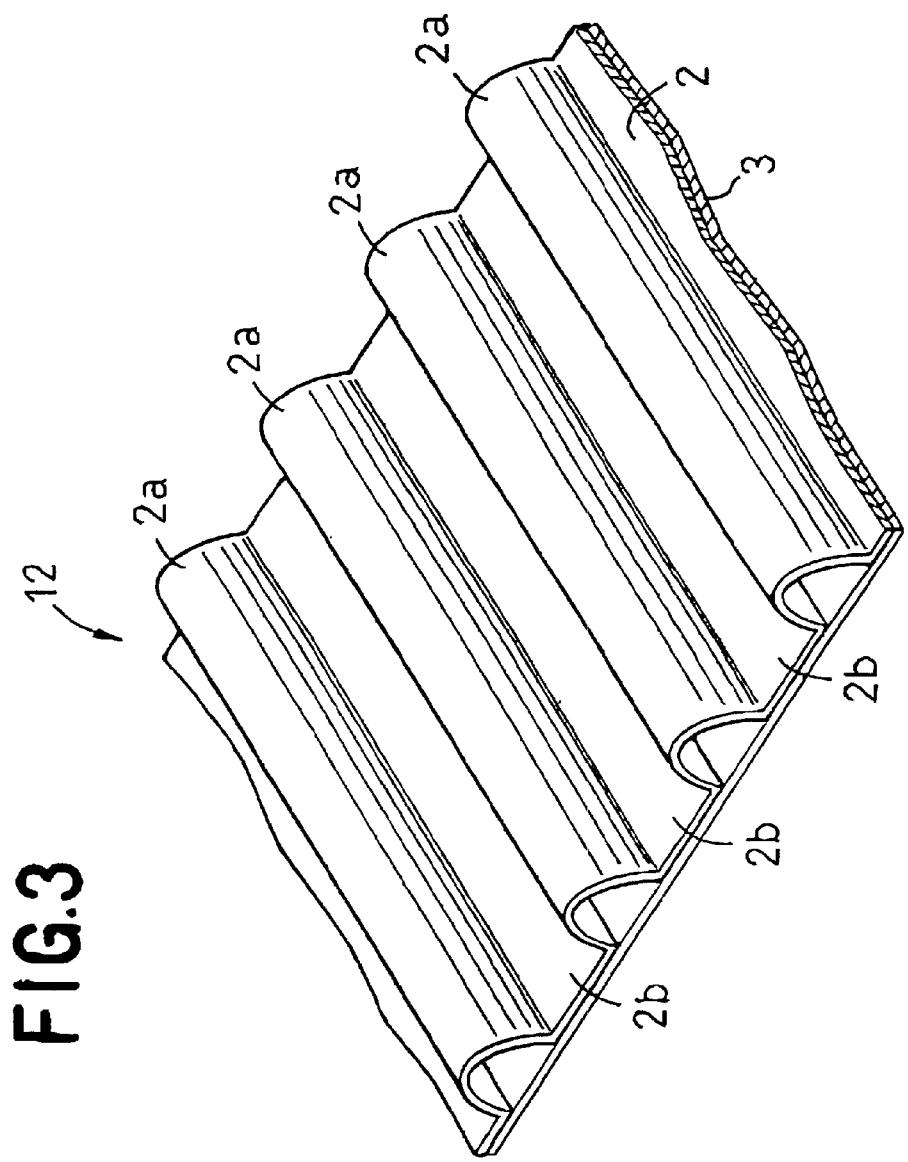
FIG. 3 is a perspective view of the elastic composite sheet obtained by the apparatus and a process according to this invention.

FIG. 3 is a perspective view of the elastic composite sheet 12 made by the apparatus 1. The composite sheet 12 comprises the non-stretchable sheet 2 and the stretchable sheet 3 laminated with each other wherein the non-stretchable sheet 2 is formed thereon with a plurality of the crests 2a extending in one direction and a plurality of the practically flat troughs 2b defined between each pair of the adjacent crests 2a and extending also in the one direction. The non-stretchable sheet 2 is sealed at the troughs 2b with the surface of the stretchable sheet 2 and the crests 2a of the non-stretchable sheet 2 are not sealed with the surface of the stretchable sheet 2. The non-stretchable sheet 2 as well as the stretchable sheet 3 can be stretched by the arc dimensions of the crests 2a as the composite sheet 12 is stretched transversely of the direction in which the crests 2a formed on the non-stretchable sheet 2 extend.

The non-stretchable sheet 2 may be formed by a non-woven fabric of thermoplastic synthetic resin fiber. The nonwoven fabric may be selected from those of various types such as spun lace-, needle punch-, melt blown-, thermal bond-, spun bondor chemical bond-type. The non-stretchable sheet has a basis weight preferably of 15–80 g/mZ, more preferably of 20–60 g/m2. Component fiber for the nonwoven fabric may be selected from various types of thermoplastic fiber such as polyolefine, polyester and polyamide fibers, and conjugated fiber such as polyethylene/polypropyrene or polyester conjugated fiber.

The stretchable sheet 3 may be formed by elastomer of thermoplastic synthetic resin. The elastomer may be selected from a group including polyolefine, polyester, polyamide and polyurethane elastomers.

Bonding between the non-stretchable sheet 2 and the stretchable sheet may be carried out *using.the heat-sealing or suitable adhesive such as hot melt adhesive. For the case in which the adhesive is used, the non-stretchable sheet 2 and the stretchable sheet 3 are fed to the apparatus 1 after the opposed surfaces of these two sheets 2, 3 have been bonded to each other. Travelling through the apparatus 1 between the ridges 7 and the grooves 8 thereof, the non-stretchable sheet 2 is forcibly stretched by the ridges 7 and broken. Contraction of the stretchable sheet 3 causes the non-stretchable sheet 2 also to be contracted and thereupon the composite sheet 12 is formed with gathers.

What is claimed is:

1. An apparatus for making an elastic composite sheet comprising: a supply of stretchable sheets and a supply of non-stretchable sheets, and a pair of rolls opposed to each other and adapted to bond together respective surfaces of the non-stretchable sheets and stretchable sheets placed one upon another and fed together into a nip of said pair of rolls, wherein:

one of said rolls has a plurality of ridges formed on a peripheral surface thereof said ridges projecting outward radially of said roll and extending circumferentially at predetermined intervals with flat troughs located between said ridges while the other of said rolls has a plurality of grooves formed on a peripheral surface thereof, said grooves recessed inward radially of said roll and extending also circumferentiauy at predetermined intervals;

said ridges are engaged with said grooves with spaces left between surfaces of said ridges and said grooves to shape said non-stretchable sheets on a surface of said one of said rolls so as to conform thereto with a plurality of crests extending in one direction and a plurality of flat troughs each defined between each pair of adjacent crests and both said non-stretchable and stretchable sheets are spaced apart from said plurality of grooves of said other of said rolls; and a bonding means to bond said non-stretchable sheets only along said troughs thereof to the surface of said stretchable sheets, said bonding occurring upon said sheets being between said pair of rolls.

2. The apparatus according to claim 1, wherein a value corresponding to a peripheral length of one ridge between adjacent troughs divided by a linear length of said one ridge between adjacent troughs is in a range of 1.5–4.5.

3. The apparatus of claim 2, wherein said bonding means comprises a heat sealing means.

4. The apparatus according to claim 1, wherein a value corresponding to a linear length of one ridge between adjacent troughs divided by a linear length between adjacent ridges is in a range of 0.1–0.5.

5. The apparatus of claim 4, wherein said bonding means comprises a heat sealing means.

6. The apparatus according to claim 1, wherein a stretch ratio of said composite sheet a obtained transversely of the direction in which said crests extend is defined by an equation:

the stretch ratio={(a peripheral length of one ridge between adjacent troughs+a linear length between adjacent ridges) divided by (a linear length of one ridge+a linear length between adjacent ridges)−1}×100; and wherein said stretch ratio is in a range of 33–318%.

7. The apparatus of claim 6, wherein said bonding means comprises a heat sealing means.

8. The apparatus of claim 1, wherein said bonding means comprises a heat sealing means.

9. The apparatus according to claim 1, wherein said bonding means comprises a heat sealing means and wherein the supply of said nonstretchable sheet is a supply of a nonwoven fabric of thermoplastic synthetic resin fiber wherein the supply of said stretchable sheet is a supply of an elastomer made of thermoplastic synthetic resin and wherein said non-stretchable sheet and said stretchable sheet are heat-sealed to each other between said pair of rolls.

10. An apparatus for making an elastic composite sheet comprising: a supply of non-stretchable woven fabric sheets of a thermoplastic synthetic resin fiber and a supply of stretchable sheets of an elastomer of a thermoplastic synthetic resin, and a pair of rolls opposed to each other and adapted to bond together respective surfaces of the non-stretchable sheets and stretchable sheets placed one upon another and fed together into a nip of said pair of rolls, wherein:

one of said rolls lias a plurality of ridges formed on a peripheral surface thereof, said ridges projecting outward radially of said roll and extending circumferendally at predetermined intervals with flat troughs located between said ridges while the other of said rolls has a plurality of gooves fonned on a peripheral surface thereof, said grooves recessed inward radially of said roll and also extending circumferentially at predetermined intervals;

said ridges are engaged with said grooves with spaces left between surfaces of said ridges and said grooves to shape said non-stretchable sheets on a surface of said one of said rolls so as to conform thereto with a plurality of crests extending in one direction and a plurality of flat troughs each defined between each pair of adjacent crests and both said non-stretchable and stretchable sheets are spaced apart from said plurality of grooves of said other of said rolls; and a bonding means to bond said non-stretchable sheets only along said troughs thereof to the surface of said stretchable sheets, said bonding occurring upon said sheets being between said pair of rolls.

11. The apparatus according to claim 10, wherein a value corresponding to a peripheral length of one ridge between adjacent troughs divided by a linear length of said one ridge between adjacent troughs is in a range of 1.5–4.5.

12. The apparatus of claim 7, wherein a value corresponding to a linear length of one ridge between adjacent troughs divided by a linear length between adjacent ridges is in a range of 0.1–0.5.

13. The apparatus according to claim 10, wherein a stretch ratio of said composite sheet a obtained transversely of the direction in which said crests extend is defined by an equation:

the stretch ratio={(a peripheral length of one ridge between adjacent troughs+a linear length between adjacent ridges) divided by (a linear length of one ridge+a linear length between adjacent ridges)−1}×100; and wherein said stretch ratio is in a range of 33–318%.

* * * * *